US008083275B2

(12) United States Patent
Myhre et al.

(10) Patent No.: US 8,083,275 B2

(45) Date of Patent: Dec. 27, 2011

(54) URN VAULT TRANSPORTING DEVICE

(76) Inventors: Wayne A. Myhre, Winona, MN (US); Gordon A. Myhre, Winona, MN (US)

( * ) Notice: Subject to any disclaimer, the term of this patent is extended or adjusted under 35 U.S.C. 154(b) by 22 days.

(21) Appl. No.: 12/804,416

(22) Filed: Jul. 22, 2010

(65) Prior Publication Data

US 2011/0173785 A1 Jul. 21, 2011

Related U.S. Application Data

(60) Provisional application No. 61/336,070, filed on Jan. 15, 2010.

(51) Int. Cl.
*B65G 7/12* (2006.01)

(52) U.S. Cl. .......................................................... 294/16

(58) Field of Classification Search .................... 294/15, 294/16, 28, 206, 113, 142, 143, 62; 27/4, 27/27

See application file for complete search history.

(56) References Cited

U.S. PATENT DOCUMENTS

| | | | | |
|---|---|---|---|---|
| 1,366,768 | A * | 1/1921 | Berry | 351/101 |
| 2,482,576 | A * | 9/1949 | Comstock | 294/16 |
| 2,652,715 | A * | 9/1953 | Looze | 52/749.13 |
| 2,847,243 | A * | 8/1958 | Hare | 294/16 |
| 3,232,503 | A * | 2/1966 | Thonen | 294/142 |
| 4,036,416 | A * | 7/1977 | Lowe | 211/70.2 |
| 4,109,952 | A * | 8/1978 | Monzain | 294/16 |

FOREIGN PATENT DOCUMENTS

GB 2252071 * 7/1992

* cited by examiner

*Primary Examiner* — Paul T Chin

(74) *Attorney, Agent, or Firm* — William J. Ryan

(57) ABSTRACT

A device for transporting an urn vault is provided comprising a pair of spaced, parallel A-shaped frames, each having a pair of frame members pivotally joined at their upper end. The apex of each frame is joined to the apex of the other frame by an upper connecting member, and the lower ends of each frame member are connected to the lower end of one of the frame members of the other frame by a lower connecting member. A notch engaging member is located on the lower end of each frame member to engage and be received in notches defined in the edges of opposed vertical surfaces of the urn vault. A tension spring is connected between the frame member of each frame intermediate their upper and lower ends to draw the lower ends of each frame member together.

7 Claims, 4 Drawing Sheets

URN VAULT TRANSPORTING DEVICE

REFERENCE TO RELATED APPLICATION

This application claims the benefit of U.S. Provisional Application No. 61/336,070 filed Jan. 15, 2010.

BACKGROUND OF THE INVENTION

The present invention relates to a device for transporting vaults for urns containing cremated human remains.

Cremation is one method commonly used to handle the remains of deceased persons, wherein the body is incinerated in a furnace or retort and thereby reduced to gases and bone fragments. Gases are exhausted to the air during cremation, and the remaining bone fragments are pulverized in a cremulator to reduce them to what is commonly referred to as "ashes" or cremated remains.

The cremated remains are typically delivered to the deceased's family in a container called an urn. The final disposition of the cremated remains depends on the wishes of the deceased and/or his/her family and their cultural and religious beliefs. In some instances, the cremated remains may be interred in a cemetery, much the same as an uncremated body is buried in a casket. In such instances, it is common to place the urn in a vault prior to interment.

Vaults for urns containing cremated remains are generally made out of concrete, typically rectangular in shape, on the order of 17 to 18 inches high, by 14 to 15 inches wide, by 14 to 15 inches long, and can weigh 100 pounds or more. Because of their relatively small size and relatively high weight, such vaults are difficult to transport and place in the ground.

One method commonly used to place vaults in the ground is through the use of a cable and boom truck. Notches are typically formed in each of the vertical edges of the vault. A cable is wrapped around the vault and inserted in the notches to hold them in place as the vault is raised and lowered. The free end of the cable is attached to a boom on the boom truck so that it can be lifted above the ground, transported to the interment site and then lowered into the ground. This process is cumbersome, time consuming and costly, and requires the use of a boom truck.

BRIEF SUMMARY OF THE INVENTION

It is one object of the present invention to provide a device for manually transporting vaults for urns containing cremated remains.

It is another object of the present invention to provide a device for manually transporting vaults for urns containing cremated remains that utilizes the notches formed in the vertical edges of the vault to grasp the vault for manually raising, transporting and lowering the vault.

To those ends, an urn vault transporting device is provided comprising a pair of spaced, parallel A-shaped frames. Each of the frames comprises a pair of frame members pivotally joined at one end to form the apex of the frame. The apexes of the frames are connected by means of a top connecting member and the opposite, lower ends of each of the frame members is connected to the lower end of one of the frame members of the other frame by a lower connecting member. The top connecting member and the lower connecting members are of the same length such that the frames are positioned in parallel planes and separated by a distance slightly greater than the width of a vault. The frame members of each frame are connected to the other frame member of such frame intermediate their upper and lower ends by an expansion lever and a biasing spring. The biasing spring draws the frame members toward one another by tension and the expansion lever operates to rotate the frame members away from one another when downward pressure is applied to the expansion lever. An inwardly projecting notch engaging member is provided on the lower end of each frame member to be received in and engage one of the notches formed in the vertical edges of the vault to secure the device to the vault for transporting. Handles are attached to the top connecting member for grasping, lifting and lowering the transporting device.

DETAILED DESCRIPTION OF THE PREFERRED EMBODIMENT

Figure 1:
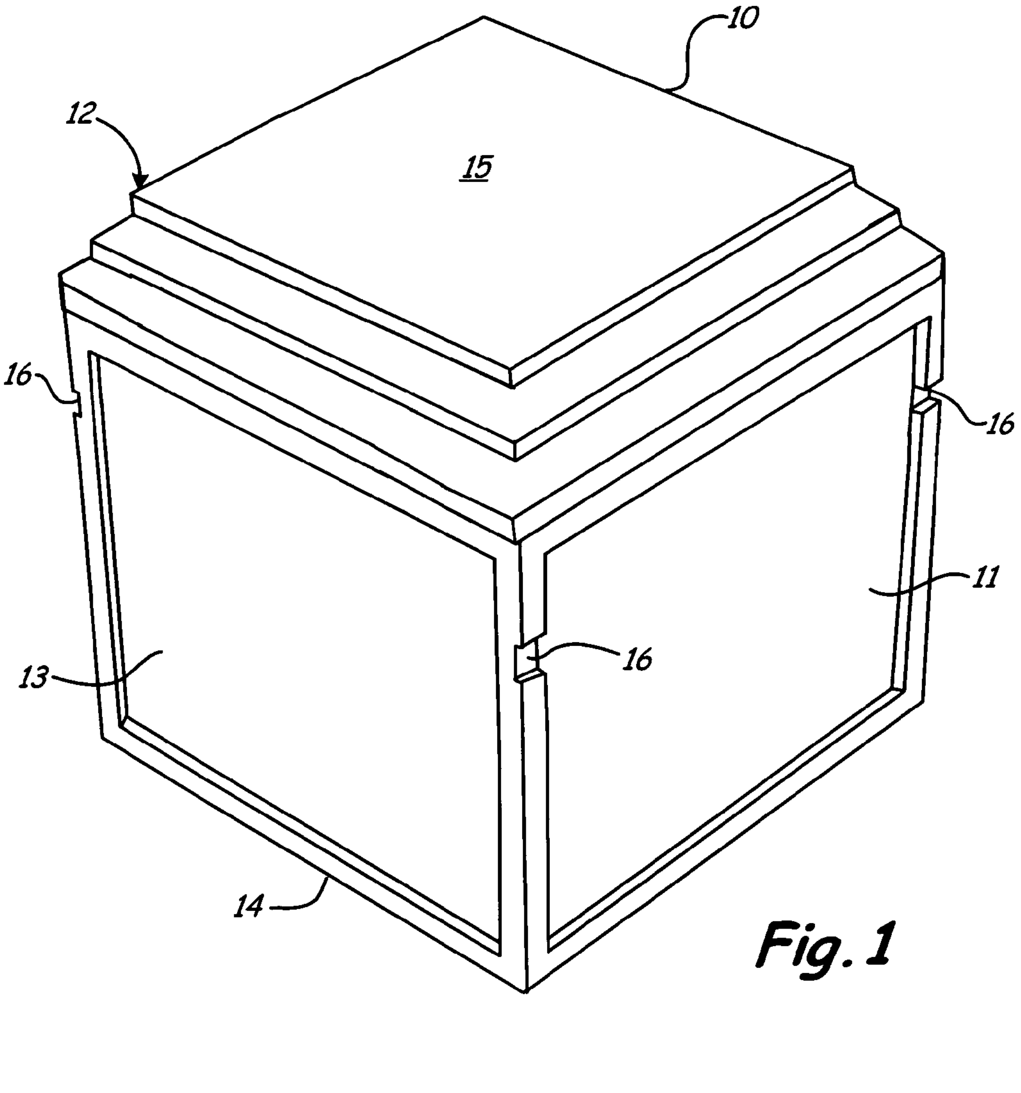
FIG. 1 is a perspective view of a typical urn vault with which the present invention is used.

The present invention has utility in conjunction with the handling of conventional urn vaults, shown in FIG. 1. A conventional urn vault 10 generally comprises a rectangular cuboid having a front 11, back 12, sides 13, bottom 14 and removal top or cover 15. Notches 16 are defined in the outer edges of the upper portions of front 11 and back 12 to receive and engage a cable for lifting, transporting and lowering vault 10 by means of a boom truck, according to prior practice.

Figure 2:
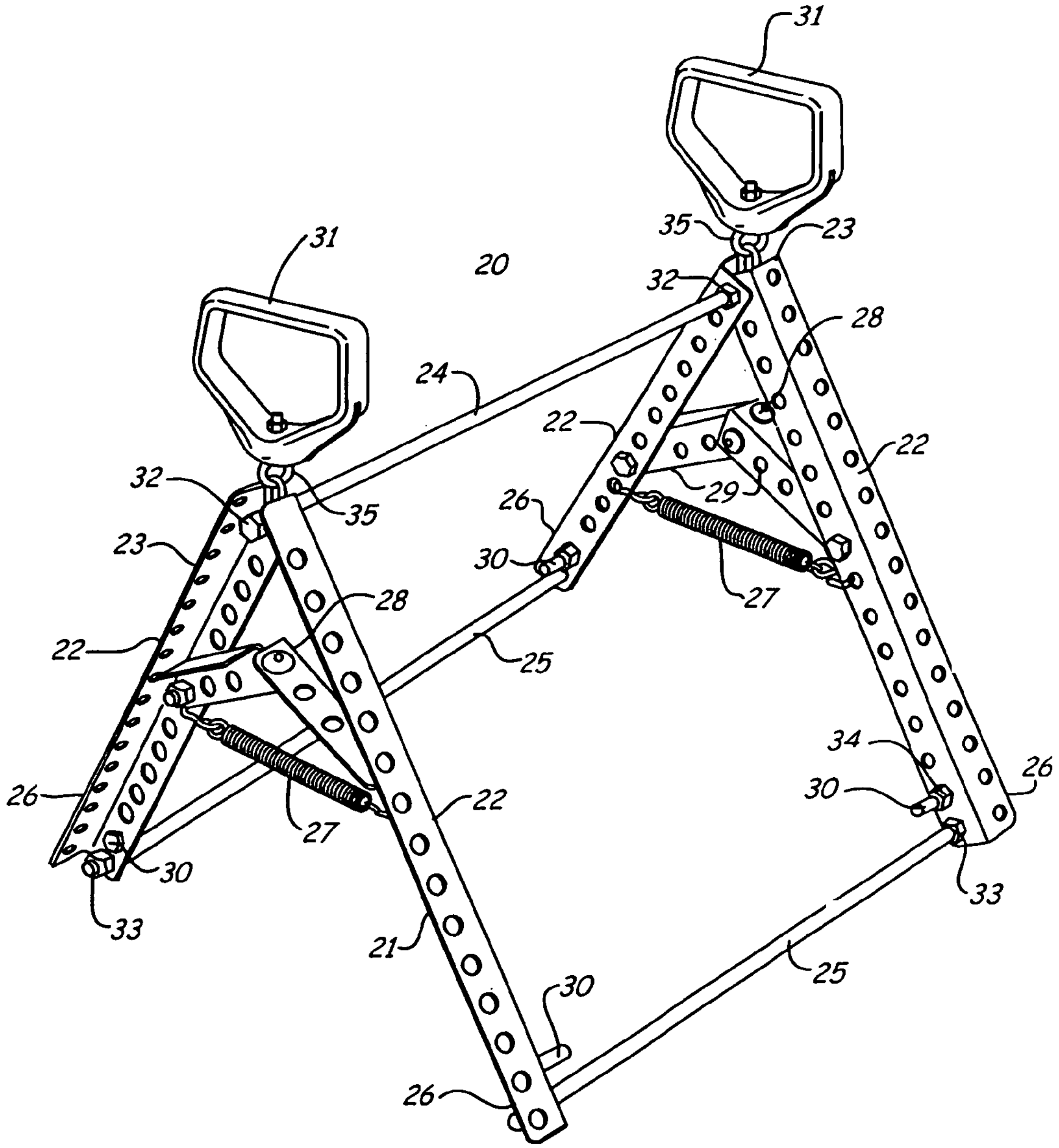
FIG. 2 is a perspective view of an urn vault transporting device according to the present invention.
Figure 3:
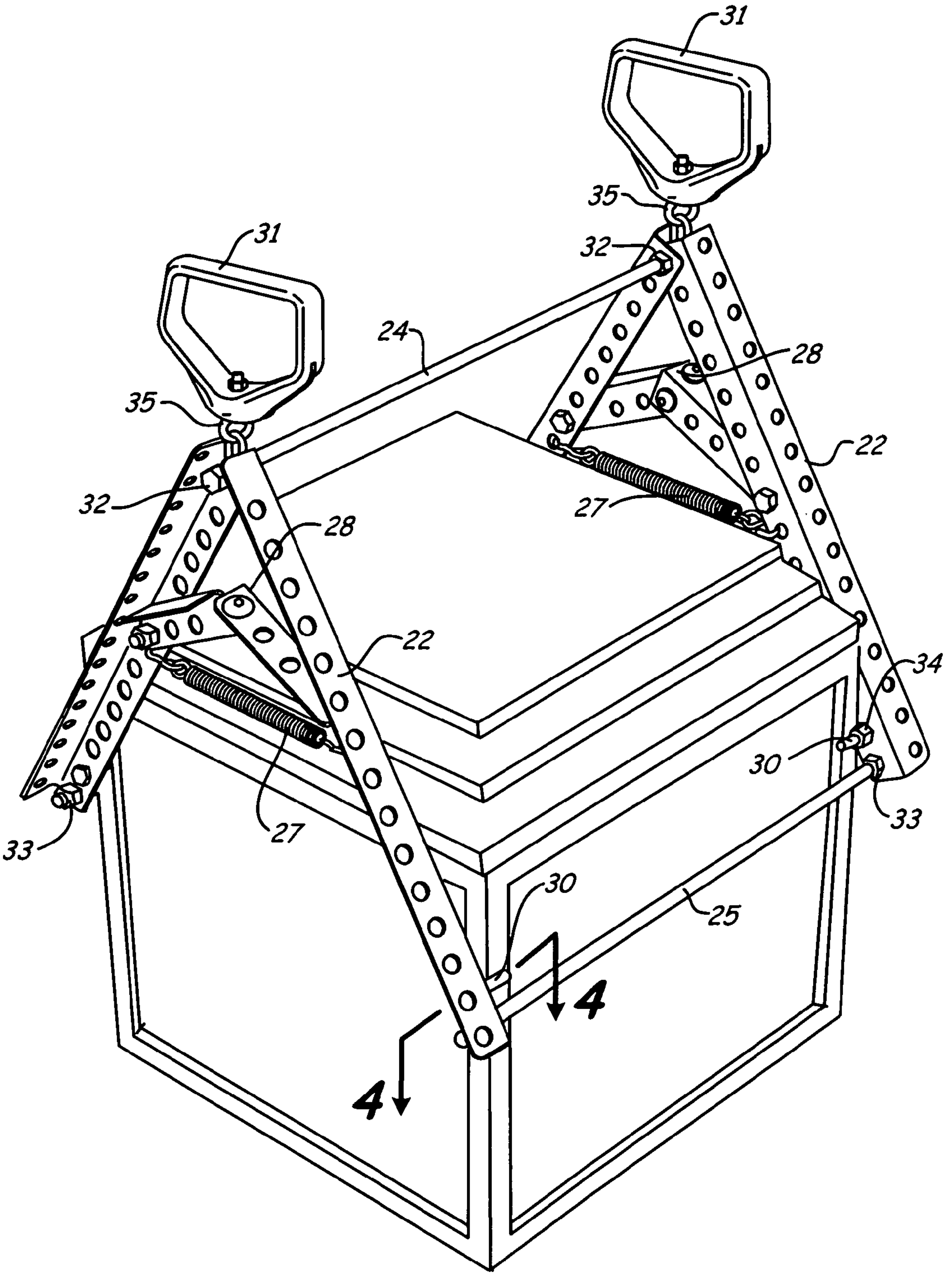
FIG. 3 is a perspective view showing the present invention engaged on an urn vault for transporting.
Figure 4:
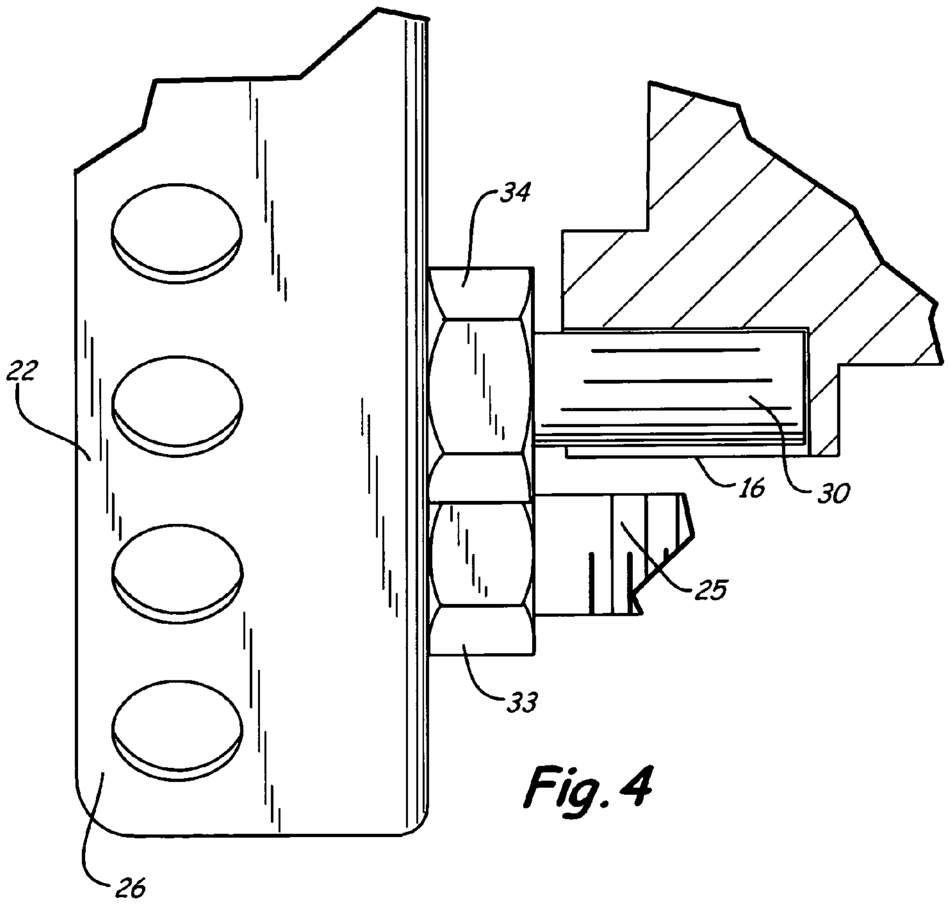
FIG. 4 is a partial plan view showing one of the notch engaging members of the present invention received and engaged to one of the notches of the vault.

As best seen in FIG. 2, the present invention is a device for transporting conventional urn vaults, generally designated 20. Device 20 generally comprises a pair of spaced, parallel A-shaped frames 21, each having two frame members 22 pivotally joined at their upper ends 23. An upper connecting member 24 connects the upper ends 23 of frame members 22. Lower connecting members 25 connect the lower ends 26 of frame members 22. Upper connecting member 24 and lower connecting members 25 are of the same length such that frames 21 are maintained essentially parallel to one another. The length of upper connecting member 24 and lower connecting members 25 is slightly greater than the width of the front 11 and back 12 of the urn vault 10 to be carried such that the urn vault 10 will fit between frames 21.

A tension spring 27 is attached to both frame members 22 in each frame 21 intermediate upper ends 23 and lower ends 26 which biases frame members 22 toward one another by tension in spring 27. An expansion lever 28 is also attached to both frame members 22 in each frame 21 adjacent spring 27. Expansion levers 28 comprise a pair of lever members 29 pivotally attached to one, another at one end and each attached to one of the frame members 22 at the other end. The length of lever members 29 is such that they form an obtuse angle when so attached, as shown. Expansion levers 28 act to spread frame members 22 when downward pressure is applied to the expansion levers 28.

Inwardly projecting notch engaging members 30 are provided on the lower ends 26 of each frame member 22 above the lower connecting members 25 and extend toward the opposite frame 21. Members 30 are sized (both in terms of width and length) to be received within one of the notches 16 of an urn vault 10 when the device 20 is in place for use.

Handles 31 are attached to the apex of each frame 21 to facilitate manual lifting and carrying of a vault 10 with device 20 attached.

A preferred method of fabrication is illustrated in the drawing. As shown, frame members 22 may be advantageously formed from L-shaped brackets having spaced holes for weight reduction. Upper connecting member 24 and lower connecting members 25 may be advantageously comprised of steel rods threaded at each end. In such instance, the upper ends 23 of each pair of frame members 22 can be attached to the corresponding end of upper connecting member 24 by inserting an end of upper connecting member 24 through aligned holes in the upper ends 23 of the corresponding frame members 22 and securing them in place by tightening nuts 32 threaded on the ends of upper connecting member 24. Lower connecting members 25 may be attached to the lower ends 26 of corresponding frame members 22 by inserting them through holes in the lower ends 26 and securing them in place by tightening nuts 33. Similarly, notch engaging members 30 may be threaded bolts inserted through holes in the lower ends 26 slightly above the lower connecting members 25 and secured in place by tightening nuts 34. Handles 31 is preferably "D" shaped and connected to the apex of one of the frames 21 by means of links 35.

In use, device 20 is placed upon an urn vault 10 by spreading the lower ends 26 of frame members 22 to receive the urn vault 10 such that lower connecting members 25 extend across the front 11 and back 12 and notch engaging members 30 are each aligned with one of the notches 16. Once the lower ends 26 are released, the tension in spring 27 will cause the lower ends 26 of each frame 21 to move toward one another until notch engaging members 30 engage the corresponding notches 16. Once the notch engaging members 30 are so engaged in the corresponding notches 16, the device 20 can be lifted by grasping handles 31 for transport. The weight of urn vault 10 will act to retain the notch engaging members 30 within the corresponding notches 16 while urn vault 10 is transported and lowered. When the urn vault is in the desired position, downward pressure on the expansion levers 28 will cause the frame members 22 to spread such that the notch engaging members 30 will disengage from notches 16, thereby permitting the device 20 to be removed from the urn vault 10.

While we have described the preferred embodiment of our invention, it will be apparent to those skilled in the art that other embodiments are possible within the scope of our invention.

What is claimed is:

1. A device for transporting an urn vault having notches defined in the outer edges of opposed surfaces, comprising:

(a) a pair of parallel, spaced frames, each of said frames having a pair of frame members having an upper end and a lower end, each of the lower ends of each of said frame members being connected to one of the lower ends of the other of said frame members;

(b) notch engaging members on each of said lower ends of each of said frames, said notch engaging members being sized to be received and fit within the notches of an urn vault;

(c) means for biasing said lower ends of each of said frames toward one another;

(d) means for spreading the lower ends of each of said frames away from one another; and (e) means for manually lifting said device.

2. A device for transporting an urn vault according to claim 1, wherein each of said frames comprises a pair of frame members having an upper end and a lower end, said upper ends of each of said frame members being pivotally attached to said upper end of the other frame member of said frame.

3. A device for transporting an urn vault according to claim 1, wherein said means for biasing said lower ends of said frames toward one another comprises a pair of tension springs, one of said tension springs being attached between the frame members of each of said frames intermediate the upper ends and lower ends of said frame members.

4. A device for transporting an urn vault according to claim 1, wherein said means for spreading the lower ends of each of said frames away from one another comprises a pair of expansion levers, one of said expansion levers being attached between the frame members of each of said frames intermediate the upper ends and lower ends of said frame members, each of said expansion levers comprising a pair of lever members having an upper end and a lower end, said upper end of each lever member of each of said expansion levers being pivotally attached to the upper end of the other lever member of said expansion lever, and said lower end of each lever member of each of said expansion levers being pivotally attached to one of said frame members intermediate said upper end and said lower end of said frame member.

5. A device according to claim 1, wherein said means for lifting said device comprises a pair of handles, one of said handles being attached to each of said frames.

6. A device for transporting an urn vault having notches defined in the outer edges of opposed surfaces, comprising:

(a) a pair of spaced, parallel A-shaped frames, each of said frames comprising two frame members having an upper end and a lower end, said frame members of each frame being pivotally joined at their upper ends to form the apex of each of said frames;

(b) an upper connecting member connecting said apexes of said frames;

(c) a pair of lower connecting members, each of said lower connecting members connecting the lower end of one frame member with the lower end of one of said frame members of the other frame;

(d) a notch engaging member attached to the lower end of each of said frame members, each of said notch engaging members being sized to be received and fit within the notches of an urn vault;

(e) means for biasing said lower ends of each of said frames toward one another;

(f) means for spreading the lower ends of each of said frames away from one another; and (g) a pair of handles, one of said handles being attached to each of said frames.

7. A device for transporting an urn vault having notches defined in the outer edges of opposed surfaces, comprising:

(a) a pair of spaced, parallel A-shaped frames, each of said frames comprising two frame members having an upper end and a lower end, said frame members of each frame being pivotally joined at their upper ends to form the apex of each of said frames;

(b) an upper connecting member connecting said apexes of said frames;

(c) a pair of lower connecting members, each of said lower connecting members connecting the lower end of one frame member with the lower end of one of said frame members of the other frame;

(d) a notch engaging member attached to the lower end of each of said frame members, each of said notch engaging members being sized to be received and fit within the notches of an urn vault;

(e) a pair of tension springs, one of said tension springs being attached between the frame members of each of said frames intermediate the upper ends and lower ends of said frame members;

(f) a pair of expansion levers, one of said expansion levers being attached between the frame members of each of said frames intermediate the upper ends and lower ends of said frame members, each of said expansion levers comprising a pair of lever members having an upper end and a lower end, said upper end of each lever member of each of said expansion levers being pivotally attached to the upper end of the other lever member of said expansion lever, and said lower end of each lever member of each of said expansion levers being pivotally attached to one of said frame members intermediate said upper end and said lower end of said frame member; and (g) a pair of handles, one of said handles being attached to the apex of each of said frame members.

* * * * *